No. 729,227. PATENTED MAY 26, 1903.
J. B. SHEPPARD & J. J. ROSE.
TRAIN STOPPER.
APPLICATION FILED JULY 5, 1902.
NO MODEL. 2 SHEETS—SHEET 1.
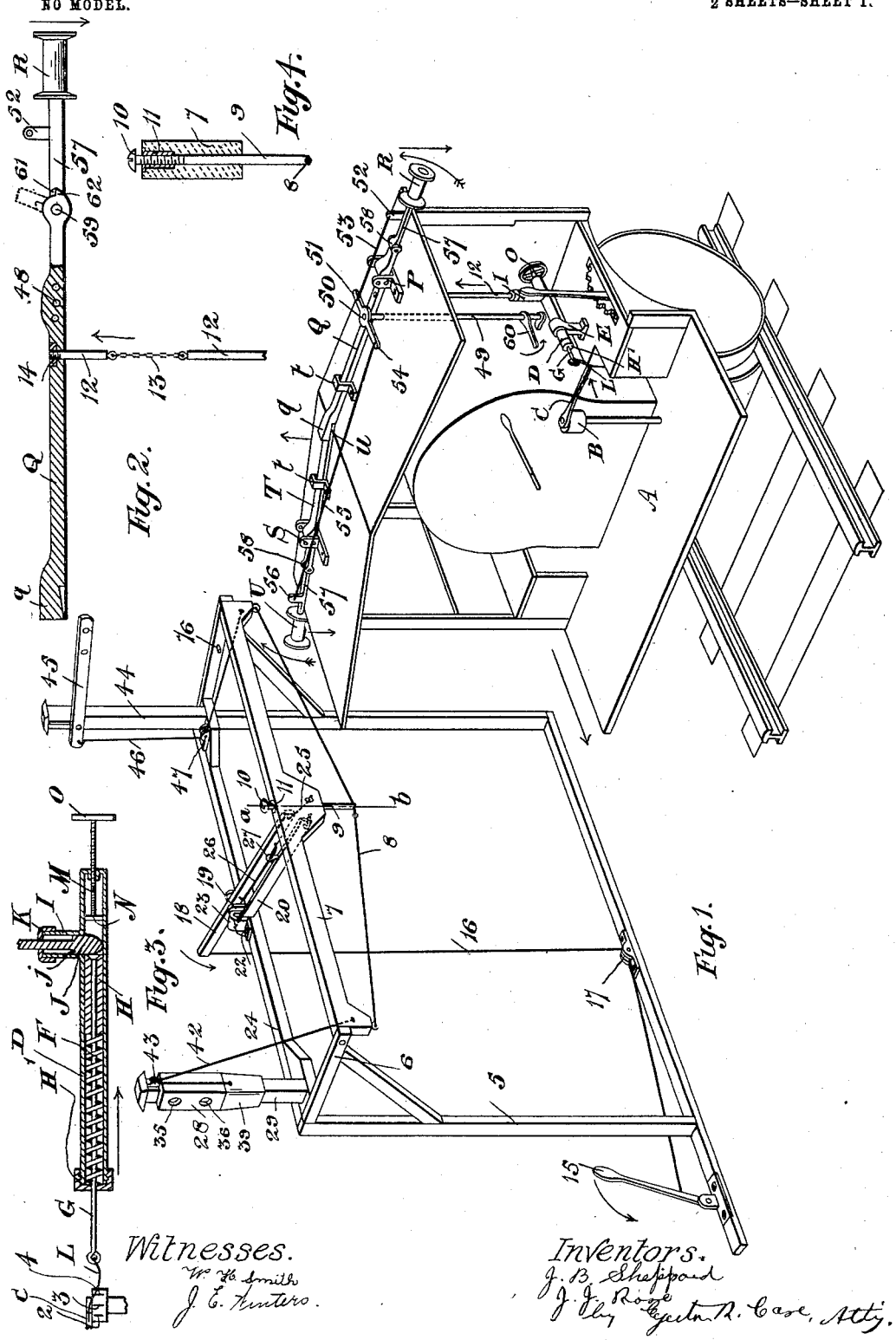
Witnesses.
Inventors.

No. 729,227. PATENTED MAY 26, 1903.
J. B. SHEPPARD & J. J. ROSE.
TRAIN STOPPER.
APPLICATION FILED JULY 5, 1902.
NO MODEL. 2 SHEETS—SHEET 2.
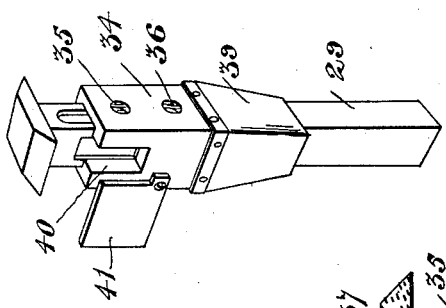
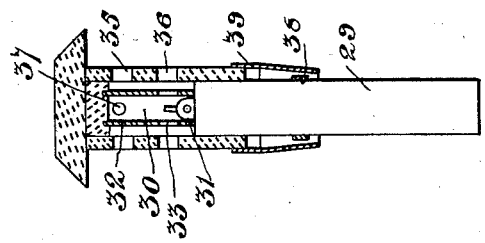
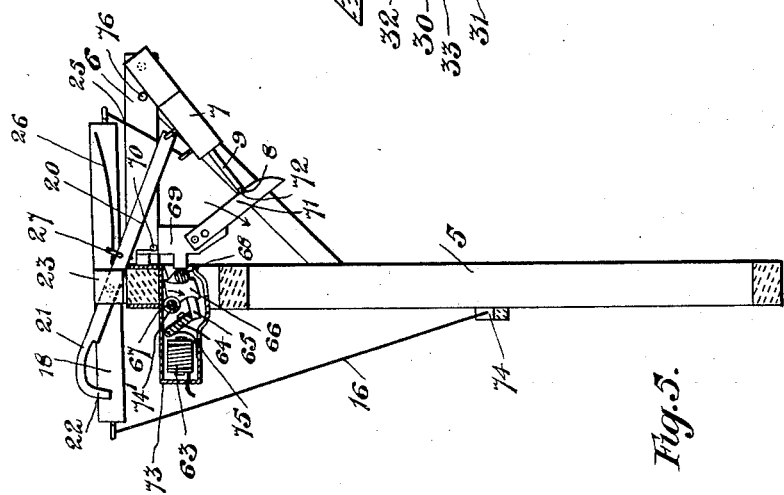
Witnesses.
Inventors.

No. 729,227. Patented May 26, 1903.

UNITED STATES PATENT OFFICE.

JAMES BENJAMIN SHEPPARD AND JOHN JOSEPH ROSE, OF TORONTO, CANADA.

TRAIN-STOPPER.

SPECIFICATION forming part of Letters Patent No. 729,227, dated May 26, 1903.

Application filed July 5, 1902. Serial No. 114,521. (No model.)

*To all whom it may concern:*

Be it known that we, JAMES BENJAMIN SHEPPARD and JOHN JOSEPH ROSE, subjects of the King of Great Britain, residing in the city of Toronto, in the county of York, in the province of Ontario, Canada, have jointly invented certain new and useful Improvements in Train-Stoppers, of which the following is a specification.

Our invention relates to improvements in train-stoppers; and the object of our invention is, first, to design a device that can be readily attached to a train or electric car and connected with the brake mechanism of same in order to operate same; secondly, by means of said train-stopper to prevent head-on and rear-end collisions; thirdly, to do away with station order-boards, and, fourthly, to design our device of the least number of parts, so that same will not get out of operation; and it consists, essentially, in combining with the brake mechanism adjustable means capable of being set so as to operate said brake mechanism so as to apply the brakes to the car-wheels with greater or less pressure, according to the way said adjustable means have been set.

Our invention further consists in providing particular mechanism suitably attached to the top of the locomotive-cab for operating said adjustable means, and, further, in providing a particular semaphore for operating said particular mechanism attached to the top of the said cab, as hereinafter more particularly explained.

Figure 1 is a perspective view of a portion of a locomotive-cab, showing the preferred form of our brake-operating mechanism connected to the air-brake lever, the preferred form of mechanism attached to the top of said cab for operating the brake-operating mechanism, and the semaphore placed to the side of the road-bed as a preferred form of means for operating these parts. Fig. 2 is a longiudinal side elevation, partly in section, of one of the arms in the preferred form of mechanism attached to the top of the cab. Fig. 3 is a longitudinal vertical section through the casing containing a spring-controlled rod and its bolt. Fig. 4 is a vertical section on the line *a b*, Fig. 1. Fig. 5 is a vertical section through an alternative form of semaphore used for operating the mechanism designed to operate the brake mechanism. Fig. 6 is a general perspective view of the sliding lantern used at night on our semaphores. Fig. 7 is a vertical section on Fig. 6 through the side lights.

In the drawings like characters of reference indicate corresponding parts in each figure.

Although we have shown our mechanism as attached to the brake-operating mechanism in the cab of the locomotive, it must be thoroughly understood that we do not confine ourselves to so placing said brake-operating mechanism, but may place same in any suitable place on the train.

A is the cab of the engine, B the usual air-brake-controlling mechanism, and C handle of same.

Suitably secured within the cab A, by means of any support or backet E, is a tubular metallic casing D, in which is contained a spring F, surrounding a rod G, (see Fig. 3,) housed within the casing D. The inner end of the rod G is provided with a head H.

H' is a cap screwing on one end of the casing D.

I is a housing secured to or forming part of the casing D, in which has movement the bolt J. Fitting over the housing I is a cap K, through which the shank of the bolt J passes.

*j* is a shoulder on the bolt J, which abuts the inner side of the cap K, and thus prevents said bolt from being moved up too far. The head of the bolt J, it will be seen, has free movement within the housing I, and from the fact that its shank has movement in the cap K the said bolt is always kept in alinement.

We of course do not confine ourselves to this construction of the device just described, as we may alter same without departing from the spirit of our invention.

The rod G is secured by any flexible connection L to the lever C, and when the bolt J is moved upwardly by means hereinafter described, so as to free the rod G, the spring F moves the rod G in the direction indicated by arrow, and consequently operates the arm C so as to apply air-brake. As will be seen from Fig. 3, the spring F is contained between the cap H' and the head H. In the outer end of the casing D a threaded rod M has movement, on the inner end of which is a disk N. O is a hand-wheel on the outer end of the threaded rod M, by means of which the disk N within the casing D is adjusted. Immediately the bolt J is moved out of the way of the head H the spring F forces said head against the disk N and applies the air-brake either at the application, service, or emergency stop, according to the distance it has to travel. The distance of travel of the head H, it will be understood, is regulated by the distance that the disk N is to or from the outer end of the casing D.

As is well known, there are three stops in use on the ordinary locomotive in connection with the air-brake mechanism. 2 is the application stop, 3 the service stop, and 4 the emergency stop.

Pivoted within the bracket P, suitably secured to the top of the cab, is an arm Q. On the outer end of this arm is journaled a reel R. On the other side of the cab, pivoted in a bracket S, secured to the top of the cab, is a somewhat similar arm T, also provided with a reel U. As will be seen from the drawings, the end $q$ of the arm Q is weighted or constructed heavier than the other portion of the arm and rests upon the end $u$ of the arm T.

$t$ represents brackets secured to the top of the cab, in which the arms Q and T have vertical movement. These brackets assist to keep said arms in position.

We do not confine ourselves to the construction of the arms Q and T.

5 is a semaphore-frame, to horizontal pieces 6 of which is pivoted a frame 7. Strung on the lower portion of the frame 7 in any suitable manner is a wire 8, which midway its length passes beneath a rod 9. The rod 9 is held in the frame 7, (see Fig. 4,) and by means of a screw 10, operating within a metallic bushing 11, secured in said frame 7, the said rod 9 is operated to adjust the tension of the wire 8, as will be understood. The semaphore 5 is designed to be operated by the station agent, so that a train may pass by said semaphore without the air-brake being automatically applied. When the frame 7 is in the position shown in Fig. 1 and the locomotive is moving in the direction indicated by arrow, the reel U comes in contact with the wire 8 and is gradually forced down in the direction indicated by the arrow, and by the time it has reached the rod 9 it is moved to its fullest downward movement. This gradual movement gradually throws the ends $u$ and $q$ upwardly in the direction indicated by arrow, and as the shank 12 of the bolt J is connected to the arm Q the said bolt is moved upwardly and releases spring-controlled rod G and applies the air-brake, as before described.

We preferably make a flexible connection between the arm Q and shank 12 of the bolt J for this reason: After the reel U has passed by the rod 9 the arms T and Q are by their own weight returned to the normal position shown in Fig. 1; but the air-brake having been applied by the mechanism before described the bolt J rests upon the head H, (which is of sufficient length,) and by means of the flexible connection 13 above described the weight of the arm Q is prevented from coming upon the bolt J. After the rod G has been operated to apply the brake it is reset again by being pulled out far enough to permit the bolt J to take up the position shown in Fig. 3. The upper portion of the shank 12 is adjustably held in the arm Q by means of a nut 14, which nut is countersunk in said arm to prevent same from turning. By means of this nut it will be understood that the shank 12 may be raised or lowered so as to regulate the fall of the bolt J. In case the station attendant wishes to move the frame 7 into position shown in Fig. 5 he moves the lever 15 in the direction indicated by arrow, and thus, by means of the flexible connection 16, passing over the pulley 17, moves the lever 18, journaled in the brackets 19, which are secured to the cross-piece 24, into the position shown in Fig. 5, thus enabling reel U to pass by said semaphore without being operated upon. Lever 18 is secured to the frame 7 by any suitable connection 25. The frame 7 is held in its normal position by means of the latch 20, pivoted to it, as shown. The said latch is provided with a notch 21, which when in position shown in Fig. 1 prevents frame 7 from inward movement.

22 is the bent end of the latch 20, which engaging with the piece 24 prevents frame 7 from being moved outwardly.

23 is a bracket suitably secured to the cross-piece 24, in which operates plate 20. This bracket keeps the said plate in alinement.

Suitably secured to the side of the lever 18 is a rod 26, on which slides an eye-hook 27, secured to the latch 20. When the lever 18 is depressed, the plate 20, by means of the eye-hook 27 and the rod 26, is raised upwardly, so that its notch 21 is moved from contact with the cross-piece 24, and during further movement of said lever is moved into position shown in Fig. 5, as before described.

We do not confine ourselves to using the frame 7 for operating the arms T and Q, nor do we confine ourselves to using reels R and U on said arms.

As it will be somewhat difficult for the engine-driver to determine (and absolutely impossible during a very dark or stormy night) the position of the frame 7, we provide a lantern 28, constructed as follows:

29 is the body of the lantern and is secured to the semaphore 5. In the upper portion of this body is a lamp-chamber 30, in which is placed the lamp 31. The sides 32 of the chamber 30 are opaque except for openings 33, through which the light escapes.

34 is a sleeve which operates around the upper portion of the body 29.

35 and 36 are openings in the side of the sleeve 34, which contain white and red glass, respectively. When the lantern is in the position shown in Fig. 1, the opening 36 registers with one of the openings 33, and thus at night-time warns the engineer that the frame 7 is in position to operate the brake mechanism. When the frame 7 is moved in the position shown in Fig. 5, the sleeve 34, of its own weight, slides down until the opening 35 registers with the opening 33, thus indicating to the engine-driver that the frame 7 is up out of the way and will not operate the brake mechanism. 37 are the ventilating-holes for the lamp. The sleeve 34 is limited in its downward movement by the stops 38, secured to the body 29. On reference to Fig. 7 it will be seen that sleeve 34 has a considerable movement.

In order to prevent the collection of snow and ice around the body 29, and so as to house a portion of the sleeve 34, we secure to the lower portion of said sleeve a metallic apron 39, which surrounds said body 29 and extends a suitable distance below the stops 38 and so prevents any snow, ice, or any other obstruction from coming in contact with said body in the path of movement of the sleeve 34.

40 is an aperture at the side of the sleeve 34, by means of which the lamp is placed in position.

41 is a suitable shutter for closing the aperture 40.

On reference to Fig. 1 it will be seen that by means of the flexible connection 42, secured at one end to the lantern and at the other end to the frame 7 and passing over the pulley 43, secured to the body 29, the sleeve 34 is raised or lowered for the purpose before described, according to the operation of the frame 7.

Pivoted to the upright 44, secured to the semaphore 5, is an arm 45, which, by means of a flexible connection 46, passing over the pulley 47, is attached to the frame 7. The object of the arm 45 is to enable the engine-driver, during the day-time, to see whether the frame 7 is in position to operate either the arms Q or T or not.

We of course do not confine ourselves to using the lantern or the arm 45 above described, but may omit same altogether.

On reference to the drawings it will be seen that by reason of a series of holes in the brackets P and S the height of the arms Q and T can be adjusted; also, that by means of the holes 48 in the arms Q and T the said arms can be adjusted to fit different widths of locomotives or cars.

Held in suitable bearings in the cab A is a rod 49, on the upper end of which is a double lever 50. The end 51 of this lever is connected to an arm 52, secured to or forming part of the arm Q by a rod 53. The end 54 of this lever is connected by a rod 55 to an arm 56, secured to or forming part of the arm T. As shown in Figs. 1 and 2, the outer ends of the arms Q and T are hinged at 58 to the main portion of said arms by pins 59. When the engine-driver wishes to prevent the arms Q and T from being operated, he moves the lever 60, keyed to the rod 49, in the direction indicated by arrow, thus by the connections before described, connected to the lever 50, throwing the reels R and U up in the direction indicated by arrow, with tails out of the way of the frame 7 and its connected parts. When the ends 57 of the arms Q and T are in the position shown in Figs 1 and 2, they, when they are moved downwardly by means of their lugs 61 abutting the lugs 62 of the major portion of the arms Q, communicate motion to the said arms, so as to operate the brake-applying mechanism, as before described.

It will of course be clearly understood that we do not confine ourselves to manufacturing the arms Q and T with hinged outer ends, nor do we confine ourselves to using, when we do manufacture the said arms with hinged outer ends, any particular means for moving said reels R and U into such position as to escape being operated upon by frame 7 and its connected parts. It will be clearly understood that the arms Q and T may be constructed without any hinged portion whatever, and it must be clearly understood that we so claim said arms.

On reference to Fig. 5 we have shown in detail an alternative form of semaphore which, by means of an electric apparatus, can be placed any suitable distance away from the station, so that in case a train-despatcher should permit a train to go out from the station when the same should have been held he can, by operating any suitable push-button, (not shown,) magnetize the electromagnet 63, thus drawing the armature 64 out of contact with the arm 65, secured to or forming part of the plate 66, permitting said plate to move in the direction indicated by arrow around its pivot 67, thus moving the roller 68, journaled to said plate 66, backwardly, thus permitting the supporting-block 69, resting against said roller, to move in the direction indicated by arrow around its hinge 70, thus moving the arm 71, secured to said supporting-block, in the direction indicated by arrow, so that the wire 8, engaged in the notches 72 in said arms, escapes from said notches and permits the frame 7 and its connected parts to move into position shown in Fig. 1. When the locomotive comes along, it will be understood that the frame 7 will at once operate the brake-applying mechanism through either of the arms Q and T and stop the train, as before described. 73 is any suitable casing containing the electromagnets 63 and their connected parts. We of course make no claim to this electric controlling device, as it is quite old. We of course may use any suitable apparatus for controlling the operation of the block 69 and the frame 7 and its connected parts. When the train that has just been stopped is ready to proceed, the train-crew, by means of the lever 74 and the connection 16, reset the mechanism in the position shown in Fig. 5. There are two of the arms 71 secured to the supporting-block 69, which each engage the wire 8 on each side of the rod 9. Surrounding the pin 67 is a coil-spring 74', which has a tendency to keep the plate 66 in the position shown in Fig. 5, so that it will be understood that when the weight of the frame 7 and its connected parts is taken off the arm 71 the said spring 74', being strong enough, will return the parts contained within the casing 73 and the supporting-block 69 into position shown in Fig. 5, so that the arms 71 will be in position again to hold the frame 7. As soon as the electromagnets 63 are demagnetized, the spring 75 returns the armature 64 into position in Fig. 5, thus locking the parts within the casing 73 securely in position and firmly supporting the supporting-block 69.

We do not confine ourselves to using the arms Q and T and their essential connections to operate the parts contained within the casing D. In case we use the arms Q and T and their essential connections we do not confine ourselves to using the frame 7 for operating the said arms.

From the drawings it will be seen that the adoption of our train-controller will not necessitate the alteration of any portion of the cab, nor will the mechanism that is directly connected to the lever of the air-brake mechanism interfere in the slightest with the operation of any of the parts within the locomotive cab nor with the independent operation of the lever C.

In case we use the frames 7 it must be understood that we do not confine ourselves to the means shown for operating said frames nor to the construction of the semaphore in which said frames are supported. Although we preferably use the arms Q and T together, it will be understood that if a locomotive were to run in such direction that its arm T, for instance, would be always on the side of the track on which one of the frames 7 was placed we can operate our device with only one of the said arms.

In order to prevent the frame 7 from being moved upwardly too far, we secure in the horizontal pieces 6 suitable pins 76, against which said frames abut. We of course do not confine ourselves to this means of defining the movement of said frame 7.

It will be seen from our specification that our train-stopper is simple in construction, positive in operation, and that by its adoption all derailing-switches are done away with.

It must be understood that we do not confine ourselves to the construction of the means shown in the casing D for regulating the movement of the head H after same has been released to the bolt J.

What we claim as our invention is—

1. In combination with the air-brake mechanism of a car, and a lever pivoted to a suitable part of said car, of a spring-controlled rod connected to said lever and said air-brake mechanism; adjustable means operating in the path of movement of said spring-controlled rod to regulate distance of movement of same so that same will operate said air-brake mechanism and apply the brakes with the pressure desired when operated by said pivoted lever, and means for operating said pivoted lever.

2. In combination with the brake mechanism of a car, of a spring-controlled rod suitably attached to said brake mechanism; a bolt operating to control movement of said spring-controlled rod, adjustable means held in the path of movement of said spring-controlled rod to regulate distance of movement of same after said bolt releases same; a tripping-lever connected to said bolt, and means for operating said tripping-lever so as to operate said bolt and allow said spring-controlled rod to be moved so as to operate said brake mechanism.

3. In combination with the air-brake mechanism of a locomotive-cab, of adjustable spring-controlled means connected to said brake mechanism capable of operating said brake mechanism, so as to apply the brakes to the car-wheels with greater or less pressure according to the position said adjustable spring-controlled means have been set at; an arm pivoted to the cab of the locomotive; a connection between said arm and said adjustable spring-controlled means; the said arm extending sufficiently beyond the side of said cab to be engaged and operated so as to operate said adjustable spring-controlled means for the purpose specified, and means for engaging with and operating said arm.

4. In combination with the brake mechanism of a car, of a casing suitably held in place; a rod operating within said casing; a head secured to said rod; a spring surrounding said rod and controlling movement of same, the said rod being attached to said brake mechanism; a bolt operating in said casing to control movement of said rod; an adjustable stop held in said casing designed to regulate distance of movement of said spring-controlled rod after said bolt releases same; a tripping-lever pivoted to a support and connected to said bolt, and means for operating said tripping-lever so as to operate said bolt and allow said rod to be moved so as to operate said brake mechanism.

5. In combination with the air-brake mechanism of a locomotive-cab, of a spring-controlled rod attached to said air-brake mechanism; a bolt for holding said spring-controlled rod in position so as not to operate the said air-brake mechanism; an arm pivoted upon the cab of the locomotive; a connection between said arm and said bolt; a reel on the extended end of said arm; the said arm extending sufficiently beyond the side of said cab so that this reel will be engaged and said arm operated so as to release said bolt, and means for engaging with said reel.

6. In combination with the air-brake mechanism of a locomotive-cab, of a spring-controlled rod attached to said air-brake mechanism; a bolt for holding said spring-controlled rod in position so as not to operate said brake mechanism; an arm pivoted upon the cab of the locomotive at one side of same and extending outwardly sufficiently to be engaged by operating means; another arm pivoted upon the cab at other side of same, this second arm resting upon said first arm; a connection between said second arm and said bolt, and means for operating said first arm and thus operate said second arm and its connection to said bolt so as to operate said brake mechanism.

7. In combination with an arm provided with a hinged outer end, and a bracket secured to a support in which said arm is pivoted, of a rod; a lever attached to said rod and connected to said hinged outer end of said arm so that when said rod is moved said outer end is moved around its hinge, as described.

8. In combination with the air-brake mechanism of a locomotive-cab; an arm pivoted to the top of said cab and extending beyond side of same; spring-controlled means attached to said air-brake mechanism to operate same, and a connection between said arm and said spring-controlled means, of a semaphore-frame secured at the side of the road-bed; a frame supported in said semaphore-frame; a wire strung from said frame and supported in such manner as to engage with said arm extending from the side of the locomotive and operate said arm and its connected parts so as to apply the air-brake, as set forth and for the purpose specified.

9. In combination with the air-brake mechanism of a locomotive-cab, an arm pivoted to the top of said cab and extending beyond side of same; spring-controlled means attached to said air-brake mechanism to operate same, and a connection between said arm and said spring-controlled means, of a semaphore-frame secured at the side of the road-bed; a movable frame supported in said semaphore-frame; a wire strung from lower side of said frame, and a rod held midway the length of said frame and supporting said wire midway its length so that said wire will be held in a downwardly-inclined position both sides of said rod, the said wire being held in position so as to engage with said arm extending from the side of the locomotive and operate said arm and its connected parts so as to apply the air-brake, as set forth and for the purpose specified.

10. In combination with the semaphore-frame, of a movable frame pivoted to same provided with a wire held at a downwardly-inclined angle from its lower side; an arm pivoted to said semaphore-frame and connected to said movable frame; a plate held in alinement with said arm and being slidingly connected to same, the said plate being connected to said movable frame and constructed to engage with said semaphore-frame to prevent said movable frame from being moved out of position, and means for operating said arm so as to move said movable frame around its pivots.

11. In combination with a casing; a spring-controlled rod operating in said casing, and a head secured to said spring-controlled rod, of a bolt operating within said casing for preventing movement of said spring-controlled rod; means for operating said bolt so as to permit movement of said spring-controlled rod; and an adjustable stop held in said casing and designed to regulate distance of movement of said spring-controlled rod after same is released by said bolt.

12. In combination with a fixed frame, of a movable frame pivoted to same, provided with a wire strung from both ends of said fixed frame at a downwardly-inclined angle, as shown; a rod held in said frame and supporting said wire at the required angle, and means supported by said fixed frame for controlling movement of said movable frame.

13. In combination with the air-brake mechanism of a locomotive-cab, of an arm pivoted upon the cab of the locomotive at one side of same and extending outwardly sufficient to be engaged by operating means; another arm pivoted upon the cab at other side of same, this second arm being associated with said first arm; a connection between said second arm and the air-brake mechanism, and means for operating said first arm and thus operate said second arm and its connection so as to operate said air-brake mechanism.

14. In combination with the air-brake mechanism of a locomotive-cab, an arm pivoted upon the top of said cab and extending outwardly sufficient to be engaged by operating means; another arm pivoted upon the cab at other side of same, this second arm being associated with said first arm, and a connection between said second arm and said air-brake mechanism, of a semaphore-frame secured at the side of the road-bed; a frame supported in said semaphore-frame; a wire strung from said frame and supported in such manner as to be engaged by said first arm and operate said arm so as to operate said second arm and its connection so as to operate said air-brake mechanism.

In testimony whereof we have signed our names to this specification in the presence of two subscribing witnesses.

JAMES BENJAMIN SHEPPARD.
JOHN JOSEPH ROSE.

Witnesses:
E. COATSWORTH, Jr.,
GUSTAV R. CASE.